United States Patent [19]

Numazawa et al.

[11] Patent Number: 4,836,050
[45] Date of Patent: Jun. 6, 1989

[54] TRANSVERSE TYPE AUTOMATIC TRANSMISSION WITH TWO SEPARATE LAY SHAFT ELEMENTS

[75] Inventors: Akio Numazawa, Nagoya; Seitoku Kubo, Toyota; Koujiro Kuramochi, Okazaki, all of Japan

[73] Assignee: Toyota Jidosha Kabushiki Kaisha, Japan

[21] Appl. No.: 443,693

[22] Filed: Nov. 22, 1982

[51] Int. Cl.⁴ ............................................. F16H 37/08
[52] U.S. Cl. ........................................ 74/695; 74/694; 74/701
[58] Field of Search ......................... 74/694, 695, 701

[56] References Cited

U.S. PATENT DOCUMENTS

| 4,056,988 | 11/1977 | Kubo et al. | 74/695 |
| 4,315,443 | 2/1982 | Kubo et al. | 74/695 |
| 4,358,586 | 3/1981 | Numazawa et al. | 74/695 |

Primary Examiner—Dirk Wright
Attorney, Agent, or Firm—Stevens, Davis, Miller & Mosher

[57] ABSTRACT

An automatic transmission includes a fluid torque converter and a first and second gear transmission mechanisn, each of which has two coaxial drive members—a power input member and a power output member—and is selectable to any one of several speed radios. Rotational power is output from the fluid torque converter to the power input member of the first gear transmission mechanism. The torque converter, and the first gear transmission mechanism including the power input and output members thereof are all coaxial on a first axis. The power input and output members of the second gear transmission mechanism rotate around a second axis parallel to the first axis, and a first lay shaft element is coupled to this power input member and extends along this second axis out from one side of the second gear transmission mechanism and is rotationally coupled to the power output member of the first gear transmission mechanism by a rotational power transfer mechanism, while a second lay shaft element is coupled to the power output member of the second gear transmission mechanism and extends along this second axis out from the other side of the second gear transmission mechanism and is fixedly coupled to a power output gear wheel.

9 Claims, 2 Drawing Sheets

TRANSVERSE TYPE AUTOMATIC TRANSMISSION WITH TWO SEPARATE LAY SHAFT ELEMENTS

BACKGROUND OF THE INVENTION

The present invention relates to a transmission for an automotive vehicle, and in particular relates to an automatic type transmission particularly suitable for use in a transverse front engine front wheel drive type automotive vehicle, or a so called FF vehicle.

There is a known type of front engine front wheel drive type automotive vehicle in which the internal combustion engine thereof is mounted transversely to the vehicle body, with its crankshaft extending at right angles to the longitudinal axis of the automotive vehicle body, i.e. parallel to the front axle line of the vehicle, and in which the automotic transmission thereof is attached to the internal combustion engine with the directions of the rotational axes of the various mechanisms contained therein likewise extending transversely to the longitudinal axis of the vehicle body. In such a transverse type of construction, it is very important to keep the axial length of the automatic transmission as short as possible, so as to fit the transmission mechanism and the rotary power train of the vehicle as a whole into the shortest possible space, in view of the severe restriction imposed on the axial length of this rotary power train by the overall width of the vehicle, within which of course the rotary power train must be accomodated.

As a transverse type automatic transmission of the abovementioned kine and improved with respect to its shortness in axial length, there has been proposed in U.S. patent application Ser. No. 418,026, filed on Sept. 14, 1982, and entitled "Transverse type automatic transmission with through lay shaft" an automatic transmission which includes a fluid torque converter and a first and a second gear transmission mechanism each of which has two coaxial drive members—a power input member and a power output member—and is selectable to any one of several speed ratios, wherein: rotational power is outputted from the fluid torque converter to the first gear transmission mechanism; the torque converter, and the first gear transmission mechanism including the power input and the power output members thereof, are all coaxial on a first axis; a through lay shaft extends along a second axis parallel to the first axis, and passes through the second gear transmission mechanism, whose power input and output members are also coaxial on the second axis, so as to support these; and a rotational power transfer mechanism transfers rotational power between the power output member of the first gear transmission mechanism and the power input member of the second gear transmission mechanism.

With the prime object of improving a transverse type automatic transmission of the abovementioned kind, there has also been proposed in U.S. patent application Ser. No. 425,257, filed on Sept. 28, 1982, and entitled "Transverse type automatic transmission with intermediate power transfer through lay shaft" an automatic transmission which includes a fluid torque converter and a first and a second gear transmission mechanism each of which has two coaxial drive members—a power input member and a power output member—and is selectable to any one of several speed ratios, wherein: rotational power is outputted from the fluid torque converter to the first gear transmission mechanism; the torque converter, and the first gear transmission mechanism including the power input and the power output members thereof, are all coaxial on a first axis; a through lay shaft extends along a second axis parallel to the first axis, and passes through the second gear transmission mechanism so as to support it, and is rotationally coupled to the power input member of the second gear transmission mechanism; a gear wheel rotationally coupled to the power output member of the first gear transmission mechanism transfers rotational power to a gear wheel meshed with it and fixed to the through lay shaft, which transfers this rotational power to the power input member of the second gear transmission mechanism; and a power output gear wheel is rotatably supported by the trough lay shaft and is rotationally coupled to the power output member of the second gear transmission mechanism.

These configurations of automatic transmission are satisfactory in minimizing the axial length of the transmission with an advantageous feature that the lay shaft assembly including the second gear transmission mechanism is supported by a through lay shaft which integrally extends over the entire axial length of the lay shaft assembly thereby providing an integrally stable and durable unit assembly for the combination of the lay shaft and the second gear transmission mechanism. However, in the configurations of automatic transmission of the above identified prior patent applications, the provision of the through lay shaft in the rotational power transmission system which includes a gear transmission mechanism and selectably provides a plurality of speed ratios inevitably requires a telescoped arrangement of an internal shaft element and an external hollow shaft element and also some related radially duplicated bearing arrangements, and therefore it raises a problem that it makes the configuration of the lay shaft assembly somewhat complicated and it also makes the assembly and disassembly procedures of the transmission delicate and difficult.

SUMMARY OF THE INVENTION

Accordingly, it is the primary object of the present invention to provide an automatic transmission whose axial length is minimized by incorporation of a lay shaft assembly including a gear transmission mechanism so as to be particularly suitable for incorporation into a transverse front engine type front wheel drive type automotive vehicle, in which the configuration thereof is simplified in spite of the incorporation of the gear transmission mechanism in the lay shaft assembly.

It is a further object of the present invention to provide an automatic transmission for an automotive vehicle, as mentioned above, which is easy to assemble and disassemble.

It is a further object of the present invention to provide an automatic transmission for an automotive vehicle, as mentioned above, which is easy to manufacture.

It is a further object of the present invention to provide an automatic transmission for an automotive vehicle, as mentioned above, which is cheap to manufacture.

It is a further object of the present invention to provide an automatic transmission for an automotive vehicle, as mentioned above, which is easy to service after installation in said automotive vehicle.

According to the present invention, these and other objects are accomplished by an automatic transmission for an automotive vehicle, comprising: (a) a fluid torque converter, comprising a rotational power input member and a rotational power output member, said rotational power input member and said rotational power output member both being rotatable about a first axial line; (b) a first gear transmission mechanism, comprising a rotational power input member and a rotational power output member, which can be selectively controlled to produce any one of a plurality of speed ratios between said rotational power input member and said rotational power output member, said rotational power input member and said rotational power output member both being rotatable about said first axial line; said rotational power input member of said first gear transmission mechanism being rotationally connected to said rotational power output member of said fluid torque converter; (c) a second gear transmission mechanism, comprising a rotational power input member and a rotational power output member, which can be selectively controlled to produce any one of a plurality of speed ratios between said rotational power input member and said rotational power output member, said rotational power input member and said rotational power output member both being rotatable about a second axial line parallel to said first axial line and displaced laterally therefrom; (d) a first lay shaft element which extends along and is rotatable about said second axial line, one end of which is coupled to said rotational power input member of said second gear transmission mechanism, and which extends out from a one side of said second gear transmission mechanism; (e) a second lay shaft element which extends along and is rotatable about said second axial line, one end of which is coupled to said rotational power output member of said second gear transmission mechanism, and which extends out from the other side of said second gear transmission mechanism; (f) a rotational power transfer mechanism which transfers rotational power between said rotational power output member of said first gear transmission mechanism and said first lay shaft element; and (g) a power output gear wheel which is fixedly supported by said second lay shaft element so as to be rotatable about said second axial line.

According to such a structure, because the lay shaft is divided into two elements, i.e. the first lay shaft element and the second lay shaft element, which extend on opposite sides of said second gear transmission mechanism, the structures of the lay shaft assembly including the second gear transmission mechanism and the first and second lay shaft elements are rendered simple, with no necessity of such a telescoped arrangement of an inner shaft and an outer hollow shaft, or such a radially duplicated bearing arrangements which rotatably support an inner shaft from a stationary housing and also rotatably supports an outer hollow shaft from said inner shaft, or vice versa.

BRIEF DESCRIPTION OF THE DRAWINGS

The present invention will now be shown and described with reference to two preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENTS

Figure 1:
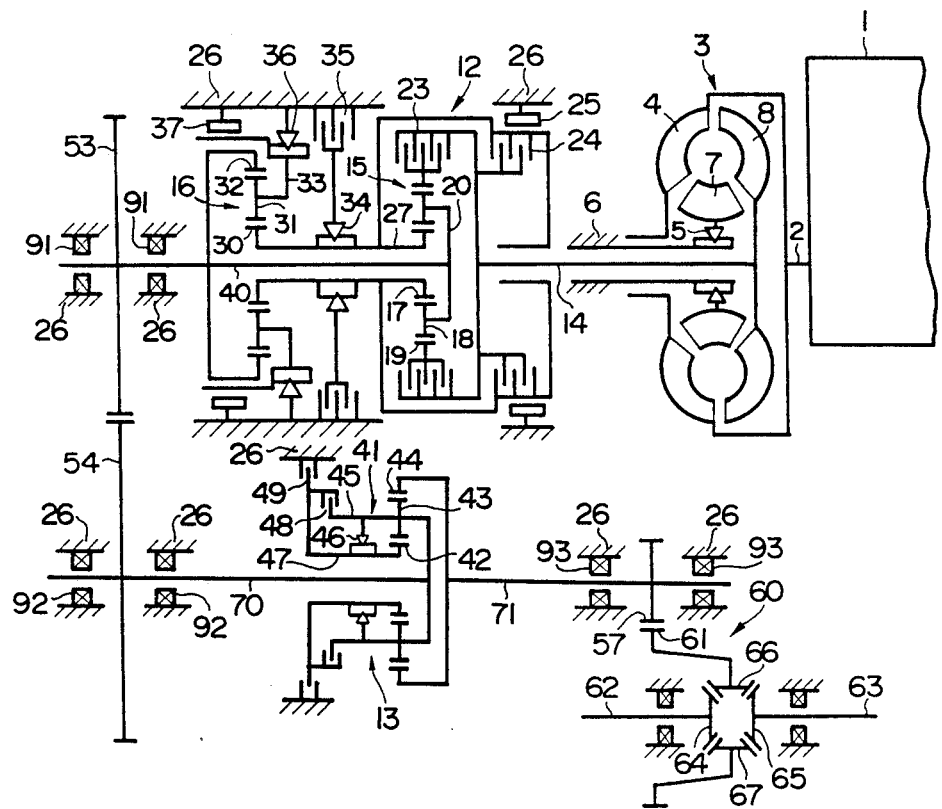
FIG. 1 is a part schematic part block diagrammatic view showing the basic layout of the fundamental mechanical elements of a first preferred embodiment of the automatic transmission according to the present invention, and also showing parts of an internal combustion engine and of a differential device which are used therewith.

The present invention will now be described with reference to the two preferred embodiments thereof, and with reference to the appended drawings. FIG. 1 shows schematically the mechanical construction of the first preferred embodiment. In this figure, the reference numeral 1 denotes an internal combustion engine of an automotive vehicle not shown in the drawings. This internal combustion engine 1 produces output rotational power at the left hand end in the figure of its crankshaft 2 which is its rotational power output member. The left hand end in the figure of said crankshaft 2 is rotationally connected to the pump impeller 4 of a fluid torque converter 3, which is the rotational power input member thereof.

The fluid torque converter 3 is of a per se well known type, and comprises the aforesaid pump impeller 4, a stator member 7 which is mounted via a one way brake 5 to a fixed portion 6 of the housing of the fluid torque converter 3, and a turbine member 8. The turbine member 8 is connected to the right hand end in the figure of a first shaft 14, which serves as a rotational power output shaft for the fluid torque converter 3.

The first shaft 14 also serves as a rotational power input shaft for a first gear transmission mechanism 12. The first gear transmission mechanism 12 comprises two planetary gear mechanisms, a first planetary gear mechanism 15 to which said first shaft 14 is rotationally coupled as will be seen hereinafter and a second planetary gear mechanism 16, said two planetary gear mechanisms 15 and 16 being arranged as coaxial with one another and with said first shaft 14 (the common axis thereof being hereinafter referred to as the first axis) and spaced apart in the axial direction. The first gear transmission mechanism 12 also comprises a second shaft 40, which is also coaxial with said first axis and which extends out from the second planetary gear mechanism 16 to the left in the figure, i.e. to the opposite side thereof from the first shaft 14, said second shaft 40 serving as a rotational power output shaft for the first gear transmission mechanism 12. In broad functional terms, the first gear transmission mechanism 12 is an underdrive mechanism, which according to selective supply of actuating hydraulic fluid pressures to various ones of a plurality of friction engaging mechanism which will be explained in detail in the following provides any one of a plurality of speed ratios between its rotational power input member (the first shaft 14) and its rotational power output member (the second shaft 40), including a directly connected speed ratio and a reverse speed ratio, all of said speed ratios except said directly connected speed ratio being reduction speed ratios in which the rotational power output member of the first gear transmission mechanism 12, i.e. the second shaft 40, rotates more slowly than does the rotational power input member of the first gear transmission mechanism 12, i.e. the first shaft 14.

The first planetary gear mechanism 15 of the first gear transmission mechanism 12 comprises a sun gear 17 and a ring gear 19, both of which are rotationally mounted coaxially with said first axis, and further comprises a planetary pinion 18, which is rotationally mounted to a carrier 20 which is also rotationally mounted coaxially with said first axis, said planetary pinion 18 being meshed between the sun gear 17 and the ring gear 19 and performing planetary motion as the carrier 20 rotates relative to the sun gear 17 between said sun gear 17 and the ring gear 19 in a per se well known way. In fact, of course, in practice several such planetary pinions as the planetary pinion 18 are provided between the sun gear 17 and the ring gear 19 as rotationally mounted to the carrier 20. The sun gear 17 is rotationally coupled to the right hand end in the figure of an intermediate hollow shaft 27, and the carrier 20 is rotationally coupled to the right hand end in the figure of the aforesaid second shaft 40. The ring gear 19 is selectively couplable to the first shaft 14 via a first clutch 23, which is a hydraulic fluid pressure actuated clutch of a per se well known sort which is engaged by supply of hydraulic fluid pressure to a pressure chamber thereof (not shown) and is otherwise disengaged, and the sun gear 17 is similarly selectively couplable (via the intermediate hollow shaft 27) to the first shaft 14 via a second clutch 24, which is also a hydraulic fluid pressure actuated clutch of a per se well known sort which is engaged by supply of hydraulic fluid pressure to a pressure chamber thereof (not shown) and is otherwise disengaged. Further, the sun gear 17 is similarly selectively couplable (via the intermediate hollow shaft 27) to the housing of the transmission, denoted by the reference numeral 26 and only partially shown, via a first brake 25, which is a hydraulic fluid pressure actuated brake of a per se well known sort which is engaged by supply of hydraulic fluid pressure to a pressure chamber thereof (also not shown) and is otherwise disengaged.

The second planetary gear mechanism 16 of the first gear transmission mechanism 12 comprises a sun gear 30 and a ring gear 32, both of which are rotationally mounted coaxially with said first axis, and further comprises a planetary pinion 31, which is rotationally mounted to a carrier 33 which is also rotationally mounted coaxially with said first axis, said planetary pinion 31 being meshed between the sun gear 30 and the ring gear 32 and performing planetary motion as the carrier 33 rotates relative to the sun gear 30 between said sun gear 30 and the ring gear 32 in a per se well known way. In fact, of course, in practice several such planetary pinions as the planetary pinion 31 are provided between the sun gear 30 and the ring gear 32 as rotationally mounted to the carrier 33. The sun gear 30 is rotationally coupled to the left hand end in the figure of the intermediate hollow shaft 27, and the ring gear 32 is rotationally coupled to and is mounted on an intermediate part of the second shaft 40 and is thus rotationally coupled to the carrier 20 of the first planetary gear mechanism 15. The intermediate hollow shaft 27 and the sun gear 17 of the first planetary gear mechanism 15 and the sun gear 30 of the second planetary gear mechanism 16 are selectively rotationally coupled in one rotational direction only to the housing 26 of the transmission via the series combination of a first one way clutch 34 and a second brake 35, which is again a hydraulic fluid pressure actuated brake of a per se well known sort which is engaged by supply of hydraulic fluid pressure to a pressure chamber thereof (also not shown) and is otherwise disengaged. The carrier 33 is always rotationally coupled in one rotational direction only to the housing 26 of the transmission via a second one way brake 36, and is also selectively coupled in both rotational directions to said housing 26 of the transmission via a third brake 37, which is again a hydraulic fluid pressure actuated brake of a per se well known sort which is engaged by supply of hydraulic fluid pressure to a pressure chamber thereof (also not shown) and is otherwise disengaged.

On the left hand end in the figure of the second shaft 40 there is fixedly mounted a gear wheel 53, which serves as a power output gear for the first gear transmission mechanism 12. As schematically shown on either side of this gear wheel 53 in the figure, there are provided a pair of bearings 91 for rotatably supporting the second shaft 40 from the casing 26 of the transmission, one on each side of the gear wheel 53. With this gear wheel 53 there is constantly meshed another gear wheel 54. This gear wheel 54 is fixedly mounted on the left hand end in the figure of a first lay shaft element 70. This first lay shaft element 70 extends along a second axis which lies below and parallel to the abovementioned first axis along which the first gear transmission mechanism 12 including the first and second planetary gear mechanisms 15 and 16 is arranged, and this first lay shaft element 70 serves as a rotational power input shaft for a second gear transmission mechanism 13. As schematically shown on either side of this gear wheel 54 in the figure, there are provided a pair of bearings 92 for rotatably supporting the first lay shaft element 70 from the casing 26 of the transmission, one on each side of the gear wheel 54.

The second gear transmission mechanism 13 comprises a third planetary gear mechanism 41, to which said first lay shaft element 70 is rotationally coupled for rotational power input as will be seen in detail hereinafter, and to which a second lay shaft element 71 is rotationally coupled for rotational power output as will also be seen in detail hereinafter. The second lay shaft element 71 is also coaxial with said second axis and extends out from the second gear transmission 13 to the right in the figure, serving as a rotational power output shaft for the second gear transmission mechanism 13. In broad functional terms, the second gear transmission mechanism 13 in this first preferred embodiment is, in contrast to the first gear transmission mechanism 12, an overdrive mechanism, which according to selective supply of actuating hydraulic fluid pressures to various ones of a plurality of friction engaging mechanism which will be explained in detail in the following provides any one of a plurality of speed ratios (which actually are two in number) between its rotational power input member (connected to the first lay shaft element 70) and its rotational power output member (connected to the second lay shaft element 71), including a directly connected speed ratio, all of said speed ratios except said directly connected speed ratio being speed increase ratios in which the rotational power output member from the second gear transmission mechanism 13, i.e. the second lay shaft element 71, rotates more quickly than does the rotational power input member to the second gear transmission mechanism 13, i.e. the first lay shaft member 70.

The third planetary gear mechanism 41 comprises a sun gear 42 and a ring gear 44, both of which are rotationally mounted coaxially with said second axis, and further comprises a planetary pinion 43, which is rotationally mounted to a carrier 45 which is also rotationally mounted coaxially with said second axis, said planetary pinion 43 being meshed between the sun gear 42 and the ring gear 44 and performing planetary motion as the carrier 45 rotates relative to the sun gear 42 between said sun gear 42 and the ring gear 44 in a per se well known way. In fact, of course, in practice several such planetary pinions as the planetary pinion 43 are provided between the sun gear 42 and the ring gear 44 as rotationally mounted to the carrier 45. The sun gear 42 is rotationally coupled to the right hand end in the figure of a sun gear shaft 47, and the carrier 45 is rotationally coupled to the right hand end of the first lay shaft element 70. The ring gear 44 is rotationally fixed to the left hand end in the figure of the second lay shaft element 71. The carrier 45 is also selectively rotationally couplable to the sun gear shaft 47 via a third clutch 48, which is again a hydraulic fluid pressure actuated clutch of a per se well known sort which is engaged by supply of hydraulic fluid pressure to a pressure chamber thereof (not shown) and is otherwise disengaged, and the sun gear 42 is similarly selectively rotationally couplable (via the sun gear shaft 47) to the housing 26 of the transmission via a fourth brake 49, which is also a hydraulic fluid pressure actuated brake of a per se well known sort which is engaged by supply of hydraulic fluid pressure to a pressure chamber thereof (not shown) and is otherwise disengaged. Further, the sun gear 42 is also always rotationally coupled in one rotational direction only via the sun gear shaft 47 to the carrier 45 via a third one way clutch 46, in such a sense that as long as the internal combustion engine 1 is urging the automotive vehicle along the road, i.e. is not in the overrunning operational condition, the sun gear 42 is rotationally coupled to the carrier 45, even when the hydraulically actuated clutch 48 is disengaged.

The second lay shaft element 71, which as mentioned above serves as a rotational power output shaft for the second gear transmission mechanism 13, extends rightwards as seen in the figure from the second gear transmission mechanism 13, to the ring gear 44 of which said second lay shaft element 71 is rotationally coupled as explained above; and its right hand end as seen in the figure extends towards the side of the internal combustion engine 1 of the third planetary gear mechanism 41 and has fixedly mounted on it a power output gear 57 for driving a differential device 60 and for thus serving as a power output gear of the second gear transmission mechanism 13. As schematically shown on either side of this gear wheel 57 in the figure, there are provided a pair of bearings 93 for rotatably supporting the second lay shaft element 71 from the casing 26 of the transmission, one on each side of the gear wheel 57.

Thus, because the second gear transmission mechanism 13 is supported between the first lay shaft element 70 and the second lay shaft element 71, and because said first lay shaft element 70 is well supported by being supported on either side of its driving wheel 54 by the two bearings 92, while similarly the second lay shaft element 71 is well supported by being supported on either side of its driven wheel 57 by the two bearings 93, thereby the construction of this transmission is stable, durable, rigid, and strong. This allows a simple axially joined assembly of the first lay shaft element 70 and the second lay shaft element 71; and also allows simple bearing supports at two axially separated portions for each of the first lay shaft element 70 and the second lay shaft element 71, on opposite sides of a power transmitting gear mounted thereon.

The power output gear 57 which is fixedly mounted on the second lay shaft element 71 serves as a power output gear of the second gear transmission mechanism 13, and is permanently meshed with a ring gear 61 of a per se well known differential mechanism 60. This differential mechanism 60 is suited for a transverse front engine front wheel drive type automotive vehicle, and comprises a pair of bevel gears 66 and 67 which are coaxially rotatably mounted to a carrier, not particularly shown, which also carries the ring gear 61, a pair of bevel gears 64 and 65 each of which meshes with both of the bevel gears 66 and 67, and a pair of axle shafts 62 and 63 each of which is rotationally coupled to one of the bevel gears 64 and 65.

In Table I, which is located at the end of this specification and before the claims appended thereto, and which is to be understood as incorporated into this specification, there is shown, for each of the transmission speed stages that can be attained in each of four manually selected transmission ranges, i.e. in a "D" or drive range, in a "2" or second range, in a "L" or low range, and in a "R" or reverse range, the engagement conditions of each of the hydraulic fluid pressure actuated friction engagement mechanisms in the first and second gear transmission mechanisms 12 and 13, i.e. of the first clutch 23, of the second clutch 24, of the first brake 25, of the second brake 35, of the third brake 37, of the third clutch 48, and of the fourth brake 49, and the engaged or free running conditions of each of the one way clutches and brakes, i.e. of the first one way clutch 34, of the second one way brake 36, and of the third one way clutch 46, in this first preferred embodiment. In this Table, the symbol "E" indicates that the corresponding hydraulic fluid pressure actuated friction engagement mechanism (i.e. the corresponding clutch or brake) is engaged, while the symbol "D" indicates that it is disengaged. Further, the symbol "(E)" indicates that the corresponding one way clutch or brake is engaged when the internal combustion engine 1 is urging the automotive vehicle along the road, i.e. is not in the overrunning operational condition, and that in such a case this engagement is being utilized; the symbol "e" indicates that the corresponding one way clutch or brake is engaged when the internal combustion engine 1 is urging the automotive vehicle along the road, i.e. is not in the overrunning operational condition, but that in such a case this engagement is not particularly being utilized, since transmission of rotational power by the transmission is in any case ensured by the engagement of some other clutch or brake which is mounted in parallel with said one way clutch or brake; and the symbol "O" indicates that the corresponding one way clutch or brake is disengaged, whether or not the internal combustion engine 1 is urging the automotive vehicle along the road.

This Table I may be used by a person of ordinary skill in the transmission art for understanding the principles of operation of the control system for the automatic transmission according to the shown first preferred embodiment of the present invention. In fact, no particular control system is shown in this specification for the automatic transmission shown in FIG. 1, because in fact various types of control system could be applied to the control thereof, and because the gist of the present invention relates to the configuration of the first and second gear transmission mechanisms 12 and 13, and the first and second lay shaft elements 70 and 71, as explained herein above, and not in the particular type of control systems utilized for the automatic transmission. Various different control systems could be adapted to control this automatic transmission by one of ordinary skill in the transmission art, based upon the disclosure herein.

Thus, as will be clear to one of ordinary skill in the art upon consideration of Table I, the first preferred embodiment of the transmission according to the present invention shown in FIG. 1 is preferably operated as a four forward speed automatic transmission, with the second gear transmission mechanism 13 left set to its directly connected speed stage while the first gear transmission mechanism 12 is shifted through its first, second, and third forward speed stages in order to provide first, second, and third forward speed stages for the transmission as a whole; and then with the first gear transmission mechanism 12 left set to its third speed stage (i.e. its directly connected speed stage) the second gear transmission mechanism 13 is shifted to its overdrive or speed increasing speed stage, in order to provide a fourth speed stage for the automatic transmission as a whole.

Figure 2:
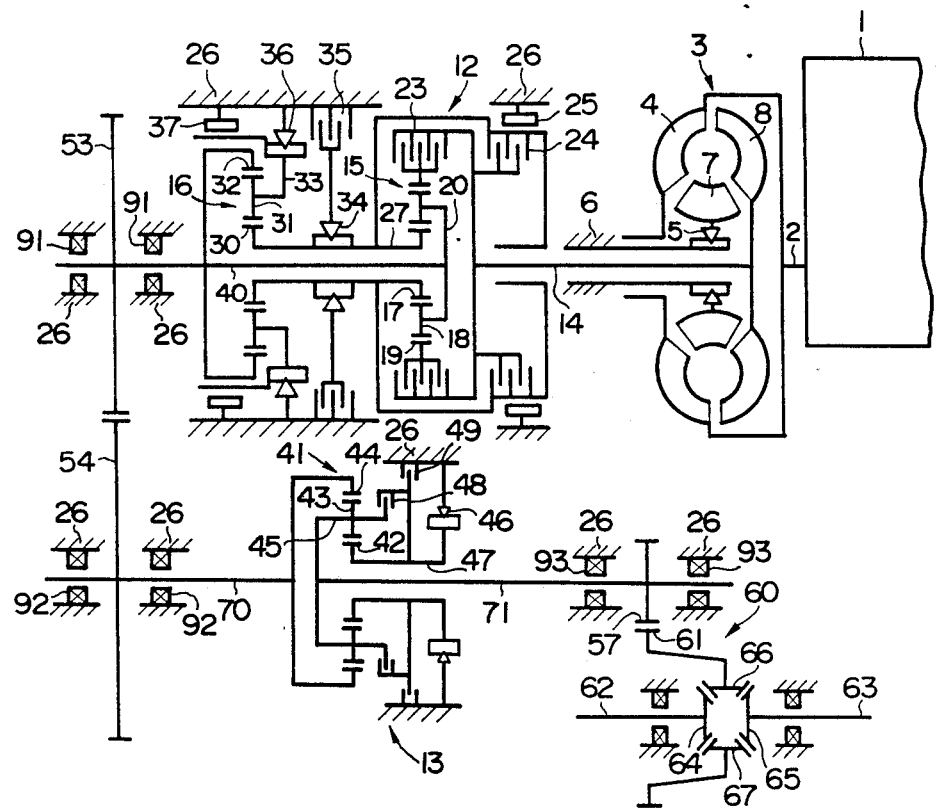
FIG. 2 is a part schematic part block diagrammatical view, similar to FIG. 1, showing similar essential mechanical parts of a second preferred embodiment of the automatic transmission according to the present invention.

Next, in FIG. 2 there is shown a second preferred embodiment of the automatic transmission according to the present invention. In this figure, parts which correspond to parts of the first preferred embodiment shown in FIG. 1 and which have like functions are designated by the same reference numerals as in that figure. Effectively, the only difference between the transmission configuration shown in FIG. 2 and the transmission configuration of the first preferred embodiment shown in FIG. 1 is that the orientation of the planetary gear mechanism 41 of the second gear transmission mechanism 13 is reversed: in other words, whereas in the first preferred embodiment shown in FIG. 1 the second gear transmission mechanism 13 was an overdrive transmission mechanism having a directly connected speed stage and an overdrive speed stage, in this second preferred embodiment the second gear transmission mechanism is an underdrive transmission mechanism having a directly connected speed stage and an underdrive speed stage. In this second preferred embodiment, therefore, the connection of the ring gear 44 and of the carrier 45 to the first and second lay shaft elements 70 and 71 is reversed, as compared with the first preferred embodiment shown in FIG. 1; in fact, in this second preferred embodiment, the ring gear 44 is rotationally connected to the first lay shaft element 70, while the carrier 45 is rotationally connected to the second lay shaft element 71. Another detail difference exists in the second embodiment, in that the one way clutch 46 is provided as connecting in one rotational direction only between the sun gear shaft 47 and the transmission casing 26, rather than between the sun gear shaft 47 and the carrier 45 as was the case in the first preferred embodiment; but the purpose of this alteration will be clear to one of ordinary skill in the transmission art, based upon the disclosure herein.

In Table II, which is located at the end of this specification and before the claims appended thereto, and which is to be understood as incorporated into this specification, there is shown, for each of the transmission speed stages that can be attained in each of four manually selected transmission ranges, i.e. in a "D" or drive range, in a "2" or second range, in a "L" or low range, and in a "R" or reverse range, the engagement conditions of each of the hydraulic fluid pressure actuated friction engagement mechanisms in the first and second gear transmission mechanisms 12 and 13, i.e. of the first clutch 23, of the second clutch 24, of the first brake 25, of the second brake 35, of the third brake 37, of the third clutch 48, and of the fourth brake 49, and the engaged or free running conditions of each of the one way clutches and brakes, i.e. of the first one way clutch 34, of the second one way brake 36, and of the third one way brake 46, in this second preferred embodiment. In this Table, again, the symbol "E" indicates that the corresponding hydraulic fluid pressure actuated friction engagement mechanism (i.e. the corresponding clutch or brake) is engaged, while the symbol "D" indicates that is is disengaged. Further, the symbol "(E)" indicates that the corresponding one way clutch or brake is engaged when the internal combustion engine 1 is urging the automotive vehicle along the road, i.e. is not in the overrunning operational condition, and that in such a case this engagement is being utilized; the symbol "e" indicates that the corresponding one way clutch or brake is engaged when the internal combustion engine 1 is urging the automotive vehicle along the road, i.e. is not in the overrunning operational condition, but that in such a case this engagement is not particularly being utilized, since transmission of rotational power by the transmission is in any case ensured by the engagement of some other clutch or brake which is mounted in parallel with said one way clutch or brake; and the symbol "O" indicates that the corresponding one way clutch or brake is disengaged, whether or not the internal combustion engine 1 is urging the automotive vehicle along the road.

This Table II may be used by a person of ordinary skill in the transmission art for understanding the principles of operation of the control system for the automatic transmission according to the shown second preferred embodiment of the present invention. In fact, again, no particular control system is shown in this specification for the automatic transmission shown in FIG. 2, because in fact various types of control system could be applied to the control thereof, and because the gist of the present invention relates to the configuration of the first and second gear transmission mechanisms 12 and 13, and the first and second lay shaft elements 70 and 71, as explained herein above, and not in the particular type of control system utilized for the automatic transmission.

Thus, as will be clear to one of ordinary skill in the art upon consideration of Table II, the second preferred embodiment of the transmission according to the present invention shown in FIG. 2 is preferably operated as a four forward speed automatic transmission, with the second gear transmission mechanism 13 left set to its speed reduction stage while the first gear transmission mechanism 12 is shifted through its first, second, and third forward speed stages in order to provide first, second, and third forward speed stages for the transmission as a whole; and then with the first gear transmission mechanism 12 left set to its third speed stage (i.e. its directly connected speed stage) the second gear transmission mechanism 13 is shifted to its directly connected speed stage, in order to provide a fourth speed stage (i.e. directly connected speed stage of both the first and second gear transmission mechanisms 12 and 13) for the automatic transmission as a whole.

As an alternative operational mode, particularly in the above shown second preferred embodiment of the transmission according to the present invention, though it is also possible in the above shown first preferred embodiment, since the second gear transmission mechanism 13 is structured as an underdrive mechanism, by suitable choosing of the numbers of gear cogs on the various gear wheels, it is possible to so arrange matters that the second gear transmission mechanism 13 is capable of being used as an auxiliary transmission system. In this case, typically the transmission as a whole will be operated with the second gear transmission mechanism 13 in the directly connected speed stage, i.e. in its higher speed stage, when the vehicle incorporating this transmission system is to be used in a manner which maximizes fuel ecomomy; and on the other hand the transmission as a whole will be operated with the second gear transmission mechanism 13 in the reduction gearing speed stage, i.e. in its lower speed stage, when the vehicle incorporating this transmission system is to be used in a manner which maximizes vehicle performance characteristics. That is to say, when the vehicle fuel economy is to be maximized, the second gear transmission mechanism 13 is set to its higher or directly connected speed stage and left there, and subsequently the first gear transmission mechanism 12 is operated in accordance with Table I (with the omission of the fourth speed stage or the O/D or overdrive speed stage line in that table) in order to provide three forward speed stages and one reverse speed stage, in a manner which provides overall gearing ratios between the internal combustion engine 1 and the axle shafts 62 and 63 which are suitable for providing good fuel economy; and, on the other hand, when the vehicle performance is to be maximized, the second gear transmission mechanism 13 is set to its lower or reduction gearing speed stage and left there, and subsequently the first gear transmission mechanism 12 is operated again in accordance with Table II in order to provide three forward speed stages and one reverse speed stage, in a manner which provides overall gearing ratios between the internal combustion engine 1 and the axle shafts 62 and 63 which are suitable for providing good vehicle performance, i.e. somewhat lower gearing ratios than in the above explained vehicle fuel economy case.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

TABLE I

| CLUTCH/BRAKE | (23) | (24) | (25) | (35) | (37) | (34) | (36) | (48) | (49) | (46) |
|---|---|---|---|---|---|---|---|---|---|---|
| DRIVE RANGE: | | | | | | | | | | |
| FIRST SPEED | E | D | D | D | D | O | (E) | D | D | (E) |
| SECOND SPEED | E | D | D | E | D | (E) | O | D | D | (E) |
| THIRD SPEED | E | E | D | D | D | O | O | D | D | (E) |
| FOURTH SPEED (O/D) | E | E | D | D | D | O | O | D | E | O |
| SECOND RANGE: | | | | | | | | | | |
| FIRST SPEED | E | D | D | D | D | O | (E) | D | D | (E) |
| SECOND SPEED | E | D | E | E | D | e | O | E | D | e |
| LOW RANGE: | | | | | | | | | | |
| FIRST SPEED | E | D | D | D | E | O | e | E | D | e |
| REVERSE RANGE | D | E | D | D | E | O | O | E | D | O |

TABLE II

| CLUTCH/BRAKE | (23) | (24) | (25) | (35) | (37) | (34) | (36) | (48) | (49) | (46) |
|---|---|---|---|---|---|---|---|---|---|---|
| DRIVE RANGE: | | | | | | | | | | |
| FIRST SPEED | E | D | D | D | D | O | (E) | D | D | (E) |
| SECOND SPEED | E | D | D | E | D | (E) | O | D | D | (E) |
| THIRD SPEED | E | E | D | D | D | O | O | D | D | (E) |
| FOURTH SPEED | E | E | D | D | D | O | O | E | D | O |
| SECOND RANGE: | | | | | | | | | | |
| FIRST SPEED | E | D | D | D | D | O | (E) | D | D | (E) |
| SECOND SPEED | E | D | E | E | D | e | O | D | E | e |
| LOW RANGE: | | | | | | | | | | |
| FIRST SPEED | E | D | D | D | E | O | e | D | E | e |
| REVERSE RANGE | D | E | D | D | E | O | O | D | E | O |

What is claimed is:

1. An automatic transmission for an automotive vehicle, comprising:
   (a) a fluid torque converter, comprising a rotational power input member and a rotational power output member, said rotational power input member and said rotational power output member both being rotatable about a first axial line;
   (b) a first gear transmission mechanism, comprising a first rotational power input member and a first rotational power output member, which can be selectively controlled to produce any one of a plurality of speed ratios between said first rotational power input member and said first rotational power output member, said first rotational power input member and said first rotational power output member both being rotatable about said first axial line; said first rotational power input member of said first gear transmission mechanism being rotationally connected to said rotational power output member of said fluid torque converter;

(c) a second gear transmission mechanism having a driving side an an opposed driven side, comprising a second rotational power input member and a second rotational power output member, which can be selectively controlled to produce any one of a plurality of speed ratios between said second rotational power input member and said second rotational power output member, said second rotational power input member and said second rotational power output member both being rotatable about a second axial line parallel to said first axial line and displaced laterally therefrom;

(d) a first lay shaft element which extends along and is rotatable about said second axial line, one end of which is coupled to said second rotational power input member of said second gear transmission mechanism, and which extends outwardly and away from the driving side of said second gear transmission mechanism;

(e) a second lay shaft element separate from said first lay shaft, which extends along and is rotatable about said second axial line, one end of which is coupled to said second rotational power output member of said second gear transmission mechanism, and which extends outwardly and away from the driven side of said second gear transmission mechanism;

(f) a rotational power transfer mechanism which transfers rotational power between said first rotational power output member of said first gear transmission mechanism and said first lay shaft element; and (g) a power output gear wheel which is fixedly supported by said second lay shaft element so as to be rotatable about said second axial line.

2. An automatic transmission for an automotive vehicle according to claim 1, wherein said rotational power transfer mechanism comprises a first gear wheel which is rotatable about said first axial line and which is rotationally connected to said first rotational power output member of said first gear transmission mechanism and a second gear wheel which is meshed with said first gear wheel and which is fixedly supported by said first lay shaft element so as to be rotatable about said second axial line.

3. An automatic transmission for an automotive vehicle according to claim 1, wherein said first gear transmission mechanism and said second gear transmission mechanism are both underdrive mechanisms.

4. An automatic transmission for an automotive vehicle according to claim 1, wherein said first gear transmission mechanism is an underdrive mechanism and said second gear transmission mechanism is an overdrive mechanism.

5. An automatic transmission for an automotive vehicle according to claim 3, wherein said second gear transmission mechanism comprises a planetary gear mechanism including a sun gear, a ring gear, a plurality of planetary pinions, and a carrier, said ring gear being rotationally connected with said first lay shaft element, while said carrier is rotationally connected with said second lay shaft element.

6. An automatic transmission for an automotive vehicle according to claim 4, wherein said second gear transmission mechanism comprises a planetary gear mechanism including a sun gear, a ring gear, a plurality of planetary pinions, and a carrier, said carrier being rotationally connected with said first lay shaft element, while said ring gear is rotationally connected with said second lay shaft element.

7. An automatic transmission for an automotive vehicle according to claim 1, further comprising a pair of bearings which support said first lay shaft element, said bearings being disposed one on each side of the part of said first lay shaft element on which said rotational power transfer mechanism bears.

8. An automatic transmission for an automotive vehicle according to claim 2, further comprising a pair of bearings which support said first lay shaft element, said bearings being disposed one on each side of the part of said first lay shaft element on which said second gear wheel is fixed.

9. An automatic transmission for an automotive vehicle according to claim 1, further comprising a pair of bearings which support said second lay shaft element, said bearings being disposed one on each side of the part of said second lay shaft element on which said power output gear wheel is fixed.

* * * * *